March 12, 1968  M. O. HOENIG  3,372,531

VACUUM DEVICE

Filed Sept. 8, 1964

United States Patent Office 3,372,531
Patented Mar. 12, 1968

3,372,531
VACUUM DEVICE
Mitchell O. Hoenig, Wayland, Mass., assignor to National Research Corporation, Cambridge, Mass., a corporation of Massachusetts
Filed Sept. 8, 1964, Ser. No. 394,752
6 Claims. (Cl. 55—269)

The present invention relates to techniques of refrigerated adsorption and particularly to cold traps and pumps for gases and vapors.

It is well known to trap gases at low temperatures within a porous substance such as activated charcoal or synthetic zeolite, e.g., calcium aluminum silicate. The porous substance is cooled to temperatures in the cryogenic range (20–30° K. temperature range being preferred) and exposed to the gas to be sorbed in a closed space. A very rapid drop in gas pressure is produced.

Prior art devices for utilizing this "cryosorption" phenomenon are disclosed in U.S. Patent 3,116,764 (Jepsen); British Patent 815,067 (Blears); and U.S. Patent 2,465,229 (Hipple).

It is the principal object of this invention to provide an improved product for cryosorption trapping of gases and vapors and a method of making such a product. The improvement is obtained by providing a better means of heat removal from sorbing surface to cooling means. This is obtained by metallizing particles and metal bonding them to a cooled panel. Since sorbents are poor thermal conductors, their thickness can be reduced by abrasion (e.g. filing or grinding) after bonding. In this manner relatively large particles can be bonded, yet very thin final sorbent layers can be provided.

The invention, briefly stated, comprises a heat sink panel in the form of a wall or plate member, means for cooling the panel to cryogenic temperatures and metallized particles (such as, for example, metallized pellets or metallized fibers) of porous sorbent substance secured to the panel by soldering, brazing, or the like. The particles are characterized in that they are ground over a portion thereof to strip the metal coating and provide a clean unsaturated surface. The layer of sorbent particles is characterized by its thinness and rapid thermal response due to its thinness and metallic bonding to the heat sink panel.

Other objects, features and advantages of the invention will be apparent from the following description of a preferred embodiment of the invention taken in conjunction with the drawings wherein.

A first step is to select the appropriate porous substance. A preferred choice is the zeolite sold commercially under the trademark, Zeolon. The zeolite is generally in the form of approximately cylindrical granules or pellets about ⅛ inch in diameter and ¼ inch long, although sizes can vary considerably.

Figure 1:
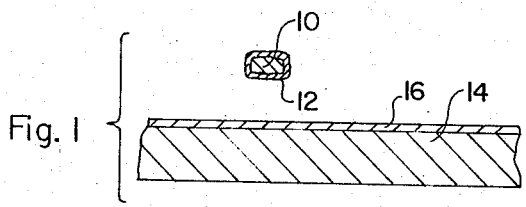
FIG. 1 shows a metallized pellet of zeolite.

The pellets or granules are metallized in a vacuum chamber to apply a coating of copper, silver, or other bondable metal. The pellet 10 is shown in FIG. 1 with a metal coating having a thickness in excess of .0001 inch and less than .01 inch. During the coating process the pellets 10 are heated to maintain their temperature at about 200° C. to 250° C. The pellets are tumbled during the coating process to coat them on all sides and are cooled down to room temperature while under vacuum in order to minimize metal oxidation.

A metal panel 14 is "tinned" with a solderable metal to prepare it for soldering. The tinning coat 16 is applied in accordance with conventional soldering practice. The metallized pellets are placed on the tinned surface of the panel and soldered to the panel. A good solder alloy for this purpose is the commercially available 95% tin–5% silver alloy which has a melting point of 250° C. It is a requirement of any solder used for this purpose that it have a melting point in excess of 200° C. (a minimum desirable regeneration temperature of the zeolite) and less than 600° C. (the maximum temperature which the zeolite can tolerate).

The soldering may be conducted in room atmosphere with an acid flux (e.g. hydrochloric based, 2 normal) using acid tolerant synthetic zeolite such as Zeolon, or under a controlled atmosphere, such as vacuum or hydrogen, without flux. It has been observed that the solder readily wets the metallized zeolite pellets.

Figure 2:
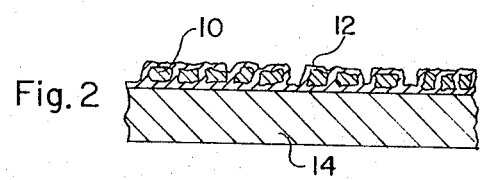
FIG. 2 shows metallized pellets soldered to a wall in accord with the process of the invention.
Figure 3:
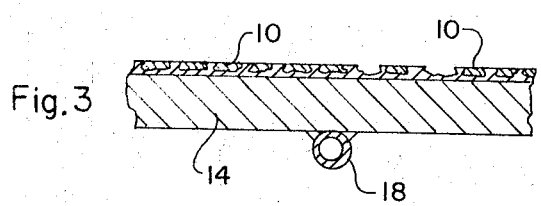
FIG. 3 shows the ground particles ready for use in cryosorption.

The resultant panel is shown in FIG. 2 where the zeolite pellets are spread along the panel surface and secured thereto by a solid state bond. However, the coating 12 limits conductance to the pellets and thickness of the layer of pellets limits heat transfer.

The layer of pellets is ground or sanded to remove the outwardly facing portions of the metal layer 12, thus exposing fresh zeolite surface. A cooling coil 18 is silver soldered to the back of the panel 14 to provide a means for cooling.

Figure 4:
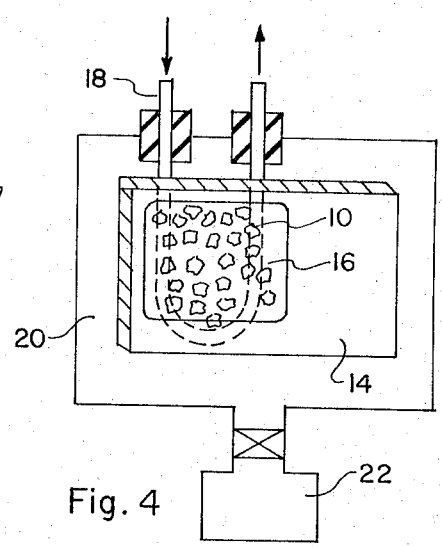
FIG. 4 shows the application of the invention.

A typical usage of the finished panel 14 is shown in FIG. 4. The panel 14 is suspended in a vacuum chamber where it is cooled to cryogenic temperature by the coil 18. The vacuum chamber 20 is initially evacuated by a roughing pump 22 which may be a mechanical pump or a panel similar to 14, but having a thicker layer of zeolite pellets on its surface. After achieving a rough vacuum the panel 14 inside the chamber is cooled. The panel 14 may be baked out, along with the system, to as high a temperature as the solder will permit.

The panel 14 can have a variety of forms, flat plates, cylinders, spheres; lining the walls of a test chamber or cold trap or suspended centrally therein. Instead of using a cooling pipe welded to the panel, cooling pipes can be built in, as in the commercially available Olin Rollbond panels. Alternatively, the panel can be cooled by forming it as the cold plate of a cryogenic refrigerator which cools by mechanical or thermoelectric means.

Figure 5:
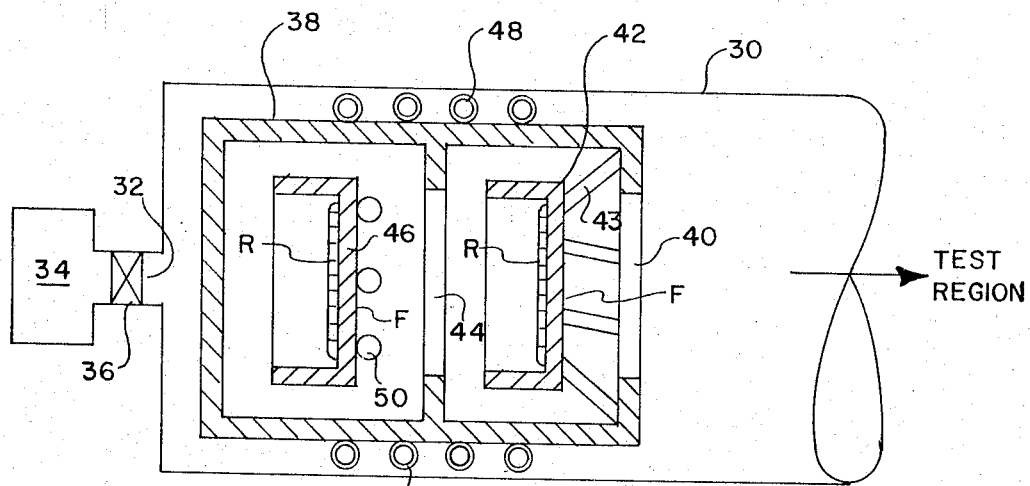
FIG. 5 shows another embodiment of the invention.

FIG. 5 shows another pumping apparatus according to the invention. A hermetically sealed chamber 30, which may be part of a main vacuum chamber or a tubular pipe attached to a vacuum chamber, is provided with a pumping port 32 at one end. A conventional vacuum pumping system 34 is connected to the port via a valve 36. An inner barrier 38 is located in the chamber 30. The barrier has first entrance 40 which is on the side of the barrier remote from pumping port 32. The entrance is opposed by a plate 42. Behind the plate 42 is a second entrance 44. A plate 46 opposes the second entrance 44. Cooling coils 48 are provided for cooling the barrier 38 and plate 42 to intermediate gas condensing temperatures and cooling coils 50 are provided for cooling plate 46 to a base gas condensing temperature. Plate 42 is supported from barrier 38 by conduction ribs 43 and tends to achieve an equilibrium temperature equal to or slightly greater than that of barrier 38 when coolant is admitted to coils 48.

The reverse faces R of the plates 42 and 46 are coated with metallized and ground sorbent as described above. Thus, saturation of the sorbent is avoided by using the forward faces F of the plates to cryopump residual gases which do not require cryosorption for removal. The plates are of dished form to limit gas conductance to the sorbent and make maximum use of cryopumping and avoid unnecessary use of sorption.

In operation a vacuum of about $10^{-5}$ to $10^{-2}$ mm. Hg is achieved by operation of the conventional system 34, which may comprise a diffusion pump and mechanical pumps or mechanical pumps only. Then the chamber, barrier and plates are heated by heaters (not shown) to bake out volatile constituents and regenerate the sorbent. The chamber and barrier are heated to about 250° C. and the plates are heated to about 200° C. The pumping system 34 removes the volatiles desorbed during this bakeout. Then liquid nitrogen is admitted to coils 48 to cool the barrier to about 77° K. and therefore to cool the plate 42 to about 80° K. The forward face F of plate 42 condenses water vapor and high mass hydrocarbon vapors. The reverse face R of plate 42 with its sorbent surface sorbs air, nitrogen, argon and carbon dioxide. Subsequently, coolant is admitted to coils 50 to reduce its temperature. The coolant may be gaseous hydrogen for maintaining the plate temperature at 20 to 30° K. for pumping hydrogen and neon or the coolant may be liquid helium for reducing the plate temperature to 4.2° K. so that the sorbent on the reverse face of the plate also pumps helium.

As indicated above, several known techniques may be employed for cooling the panels 42 and 46.

The characteristic advantages of the present invention are (a) that the sorbent particles are firmly held to the panel despite vibration and thermal cycling, (b) that the metallic adhesive does not saturate the porous interior of the particles, (c) that the metallic adhesive provides excellent heat transfer from the particles to the cooling means, (d) that the thinnest possible arrangement of particles is provided, consistent with required capacity, thus affording the best possible heat transfer condition, and (e) that the grinding can be adjusted to tailor the sorbent particle thickness to a given requirement. In regard to (a), it should be noted that the bond is stronger than the sorbent particles and is not readily chipped or rubbed off. It should also be noted that the sorbent can be regenerated in place, without removal from the panel 14. For instance, one could pass steam through coil 18 for heating to regenerate the sorbent and bake out the panel and later pass liquid nitrogen through the coil for cryosorption operation.

For some cryosorption requirements, it is possible to dispense with the abrading step. Where a very thin metallizing layer is formed, cryosorption can take place through the metal to a substantial degree. However, abrading is preferred because it provides the additional advantage of tailoring the thickness of the sorbent layer to the heat transfer and pumping capacity needs of a vacuum system.

What is claimed is:

1. A structure for use as a cryosorption vacuum pumping element, or the like, comprising a solid metal supporting member and a thin layer of individual particles of a porous substance disposed along the surface of said member, the individual particles having metal coatings thereon and being secured to the member by an intermetallic bond through said coating, the individual particles being abraded and bare of coating along portions thereof facing away from the supporting member, whereby gas or vapor can diffuse into said particles through said bare portions, and means for cooling said supporting member to cryogenic temperature and thereby cooling the particles to cryogenic temperature by heat transfer via said intermetallic bond.

2. A solid metal cryosorption plate having a coating thereon; said coating comprising a metallic matrix with partially metal coated sorbent particles embedded in said matrix and presenting bare abraded surfaces on portions of said sorbent particles facing away from the plate.

3. The plate of claim 2 as a flat panel.

4. A cryogenically cooled gas removal structure comprising a hermetically sealed chamber and at least one solid metal plate within said chamber, the plate having a coating thereon; said coating comprising a metallic matrix with partially metal coated sorbent particles embedded in said matrix and presenting bare abraded surfaces on portions of said sorbent particles facing away from the plate and means for cooling the plate to cryogenic temperature.

5. A cryogenically cooled gas removal structure comprising a hermetically sealed chamber and at least one plate and a barrier means in said chamber, the said barrier means forming a substantial enclosure about said plate and having an entrance in the said enclosure, the plate being constructed and arranged within said enclosure so that it has a forward face facing towards the entrance and a reverse face facing away from the entrance, the reverse face of the plate having a coating comprising a metallic matrix with sorbent particles embedded in said matrix and presenting bare abraded sorbent surfaces facing away from said reverse face and away from the enclosure entrance, and means for cooling the enclosure forming barrier and the plate to cryogenic temperature.

6. The structure of claim 5 wherein at least two of said plates are provided and constructed and arranged so that the plates are essentially parallel to each other and to the entrance whereby one of said plates nearer the entrance forms a line of sight barrier between the entrance and the other plate which is farther from the entrance and wherein the said cooling means are constructed and arranged to cool the plate farther away from the entrance to a lower temperature than those of the barrier or of the plate nearer the entrance.

References Cited

UNITED STATES PATENTS

| | | | |
|---|---|---|---|
| 2,924,630 | 2/1960 | Fleck et al. | 55—75 X |
| 3,077,712 | 2/1963 | Milleron | 55—208 |
| 3,181,231 | 5/1965 | Breck | 23—111 X |
| 3,296,773 | 1/1967 | Hemstreet | 55—27 |

OTHER REFERENCES

Grant et al.: Multisorption Sorption Pump, in Review of Scientific Instruments, May 1963, 34(5), pp. 587–588.

SAMIH N. ZAHARNA, *Primary Examiner.*

REUBEN FRIEDMAN, *Examiner.*

J. ADEE, *Assistant Examiner.*